(12) United States Patent
Boyd et al.

(10) Patent No.: US 8,623,221 B1
(45) Date of Patent: Jan. 7, 2014

(54) SAND SEPARATOR FOR PETROLEUM AND NATURAL GAS WELLS

(76) Inventors: Keith L. Boyd, Mineral Wells, TX (US); Scotty L. Whitsett, Mineral Wells, TX (US); Kevin J. Kinder, Mineral Wells, TX (US)

( * ) Notice: Subject to any disclaimer, the term of this patent is extended or adjusted under 35 U.S.C. 154(b) by 222 days.

(21) Appl. No.: 13/095,654

(22) Filed: Apr. 27, 2011

Related U.S. Application Data (60) Provisional application No. 61/328,883, filed on Apr. 28, 2010.

(51) Int. Cl.
  *B01D 21/24* (2006.01)
  *E21B 43/34* (2006.01)
  *B01D 19/00* (2006.01)

(52) U.S. Cl.
  CPC ........ B01D 21/2405 (2013.01); B01D 19/0042 (2013.01); E21B 43/34 (2013.01); *B01D 2221/08* (2013.01)
  USPC ........... 210/801; 210/803; 210/241; 210/519; 210/532.1; 210/539; 95/253; 96/182; 166/75.12; 166/267

(58) Field of Classification Search
  USPC .............. 210/800, 801, 803, 241, 519, 532.1, 210/533, 534, 535, 537, 539, 540; 95/241, 95/253; 96/182, 183; 166/267, 75.12
  See application file for complete search history.

(56) References Cited

U.S. PATENT DOCUMENTS

| | | | | | |
|---|---|---|---|---|---|
| 196,259 | A | * | 10/1877 | Solvay | 210/534 |
| 668,559 | A | * | 2/1901 | Fullner | 210/535 |
| 883,903 | A | * | 4/1908 | Nuss | 210/534 |
| 973,357 | A | * | 10/1910 | Lewis | 210/519 |
| 2,152,863 | A | * | 4/1939 | Bills | 210/519 |
| 4,001,116 | A | * | 1/1977 | Selcukoglu | 210/534 |
| 4,305,825 | A | | 12/1981 | Laval | |
| 5,032,273 | A | | 7/1991 | Senyard, Sr. et al. | |
| 6,119,779 | A | | 9/2000 | Gipson et al. | |
| 6,315,837 | B1 | | 11/2001 | Barclay | |
| 6,350,375 | B1 | * | 2/2002 | Bringedal et al. | 210/540 |
| 6,790,367 | B2 | | 9/2004 | Schmigel et al. | |
| 6,983,852 | B2 | * | 1/2006 | Hemstock et al. | 210/519 |
| 7,179,386 | B2 | | 2/2007 | Lange | |
| 7,575,672 | B1 | * | 8/2009 | Gilmore | 210/539 |
| 7,731,037 | B2 | * | 6/2010 | Frazier et al. | 210/532.1 |
| 2004/0020860 | A1 | | 2/2004 | Schmigel et al. | |
| 2009/0152213 | A1 | | 6/2009 | Frazier et al. | |

* cited by examiner

*Primary Examiner* — Christopher Upton
(74) *Attorney, Agent, or Firm* — Guy V. Manning (57) ABSTRACT

A sand separator for capturing sand and rock debris from recovered natural gas fracturing fluid includes a cylindrical, high-pressure-rated vessel disposed vertically and immediately downstream of the gas wellhead. High pressure fracturing fluid enters the top of the separator into an inner flue extending coaxially downward to terminate a spaced distance above the bottom of the vessel. Transverse baffles spaced apart along the length of the flue extend through the flue to the inner walls of the vessel to keep the flue centered within the separator. As the fluid enters the separator, openings through the flue near the vessel inlet permit lighter weight and gaseous constituents to escape the fluid and bypass the flue, thereby reducing the velocity of the fluid remaining inside the flue. As the remaining fluid falls to the bottom of the vessel, it further slows as it reverses direction to rise between the flue and the vessel walls. At the bottom of the vessel, sand and rock debris precipitates out of the slowed fluid and accumulates above a clean-out valve by which the debris periodically may be removed. The gas and fluid recombine relatively free of sand and rock debris and exit the vessel at one or more outlet ports through the vessel walls. The sand separator functions in both exploration and production wells for both petroleum and natural gas.

18 Claims, 5 Drawing Sheets

SAND SEPARATOR FOR PETROLEUM AND NATURAL GAS WELLS

This application claims priority from a Provisional Application Ser. No. 61/328,883, filed Apr. 28, 2010.

BACKGROUND OF THE INVENTION

1. Field of the Invention

This invention relates generally to petroleum and natural gas and oil wells, and particularly to wellhead site equipment. More particularly, this invention relates to a sand separator installed at the wellhead upstream of other surface equipment for separating sand and rock debris from well effluent fluids.

2. Description of Related Art

Exploration for methane, or natural gas, involves injection of high-pressure fluids (mostly water with sand) directly into underground rock formations expected to yield natural gas, a process commonly referred to as "hydraulic fracturing." The water pressure fractures the rock strata, whereupon entrapped natural gas escapes into the well bore to be captured at the surface and piped to market. Hydraulic fracturing fluid is recovered from the exploration wells and disposed of, usually by hauling it off in trucks to a remote disposal site.

Fracturing fluid contains a considerable amount of fracturing sand. The sand lodges in the cracks created by fracturing and holds open the cracks to maximize escape of natural gas from the strata. The sand also scours the formation to clean and etch it for maximum gas delivery. Sand included in fracturing fluid doesn't all lodge in the formation, however, and some returns to the surface in what is called the "flowback" from the well. During flowback, the well disgorges the fracturing fluid under pressure from the escaping natural gas. The flowback fracturing fluid includes a significant quantity of the injected sand, as well as granular rock debris flushed from the rock strata by the fracturing and flowback stages. Such sand and debris can wreak havoc upon choke valves that reduce the return fluid pressure and velocity downstream of the wellhead, and upon relatively sensitive surface testing, metering and processing equipment. A need exists for means for eliminating sand and rock debris from returned hydraulic fracturing fluid.

Production wells likewise need protection from fracturing sand and granular rock debris. Natural gas from producing wells comprises not only gaseous methane, but myriad other liquid byproducts, some of which are valuable (e.g. petroleum and natural gas distillates) and others of which are waste (e.g. stratigraphic saline and residual fracturing fluid), both of which may include significant quantities of sand. Surface equipment adapted for segregating well byproducts and for metering output from producing wells is vulnerable to damage from such debris. A need exists for means for separating solid materials such a sand and rock granules from producing well effluents.

SUMMARY OF THE INVENTION

A sand separator for capturing sand and rock debris from recovered natural gas fracturing fluid includes a cylindrical, high-pressure-rated vessel disposed vertically and immediately downstream of the gas wellhead. High pressure fracturing fluid enters the top of the separator into an inner flue extending coaxially downward to terminate a spaced distance above the bottom of the vessel. Transverse baffles spaced apart along the length of the flue extend through the flue to the inner walls of the vessel to keep the flue centered within the separator. As the fluid enters the separator, openings through the flue near the vessel inlet permit lighter weight and gaseous constituents to escape the fluid and bypass the flue, thereby reducing the velocity of the fluid remaining inside the flue. As the remaining fluid falls to the bottom of the vessel, it further slows as it reverses direction to rise between the flue and the vessel walls. At the bottom of the vessel, sand and rock debris precipitates out of the slowed fluid and accumulates above a clean-out valve by which the debris periodically may be removed. The gas and fluid recombine relatively free of sand and rock debris and exit the vessel at one or more outlet ports through the vessel walls. The sand separator functions in both exploration and production wells for both petroleum and natural gas.

BRIEF DESCRIPTION OF THE DRAWINGS

The novel features believed characteristic of the present invention may be set forth in appended claims. The invention itself, however, as well as a preferred mode of use and further objects and advantages thereof, will best be understood by reference to the following detailed description of an illustrative embodiment when read in conjunction with the accompanying drawings, wherein:

DESCRIPTION OF A PREFERRED EMBODIMENT

Figure 1:
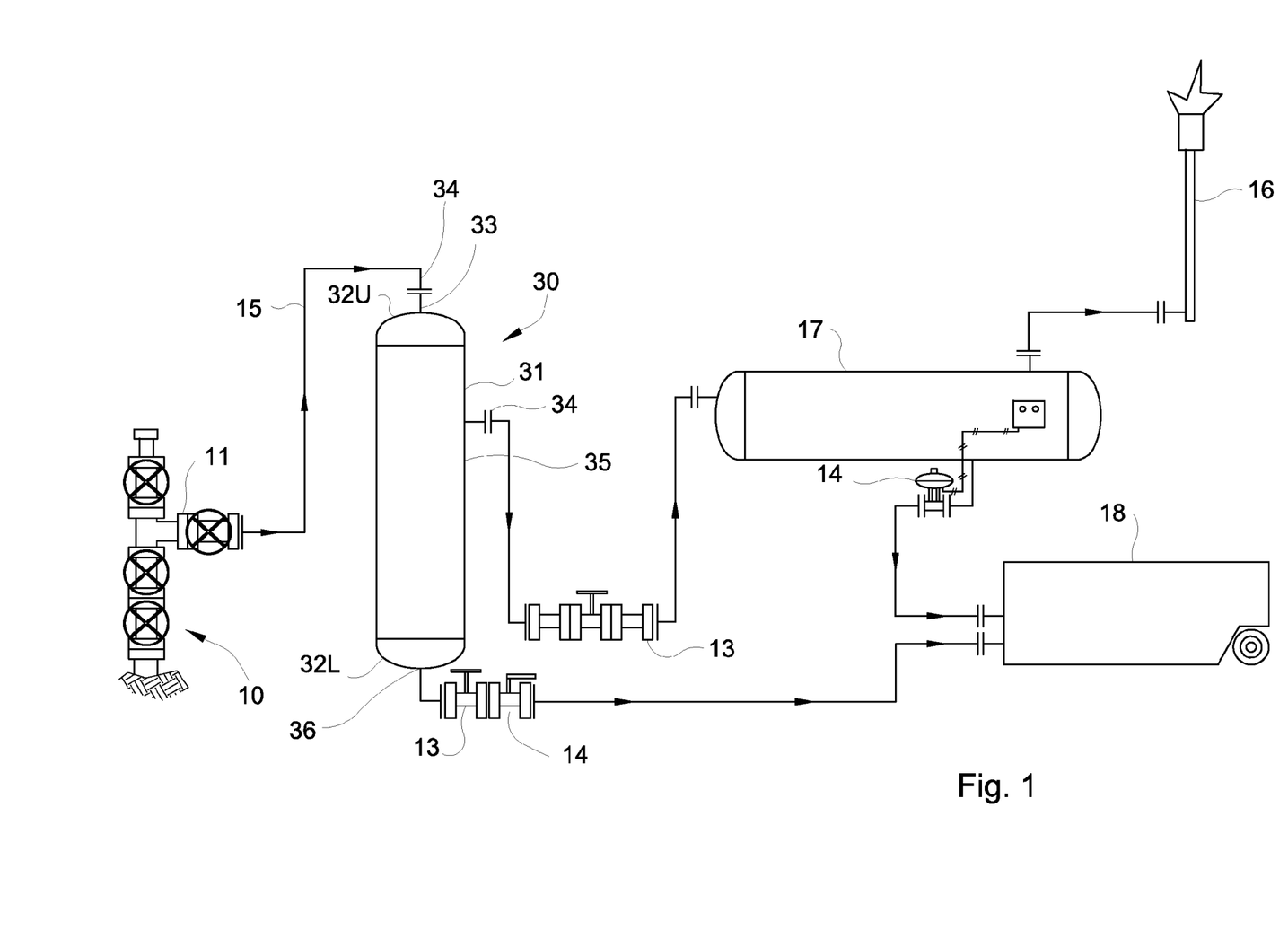
FIG. 1 shows in schematic the sand separator of the present invention installed immediately downstream of the wellhead and upstream of other surface well equipment during the flow-back phase of hydraulic fracturing operations; the separated sand and rock debris is shown being removed from the site for off-site disposal.
Figure 2:
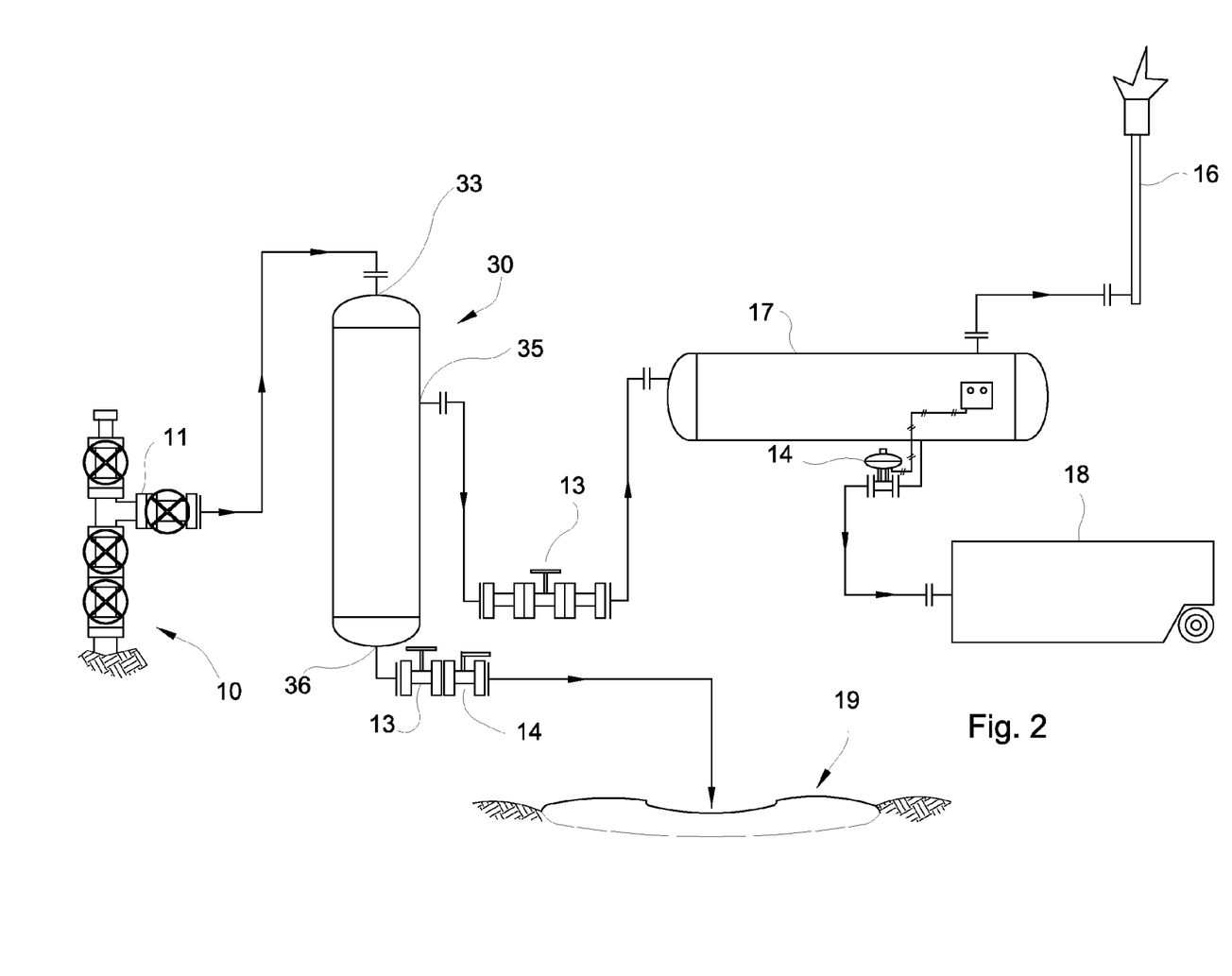
FIG. 2 shows, in schematic comparable to FIG. 1, the sand separator of the present invention where separated sand and rock debris is disposed of in an on-site pit.
Figure 3:
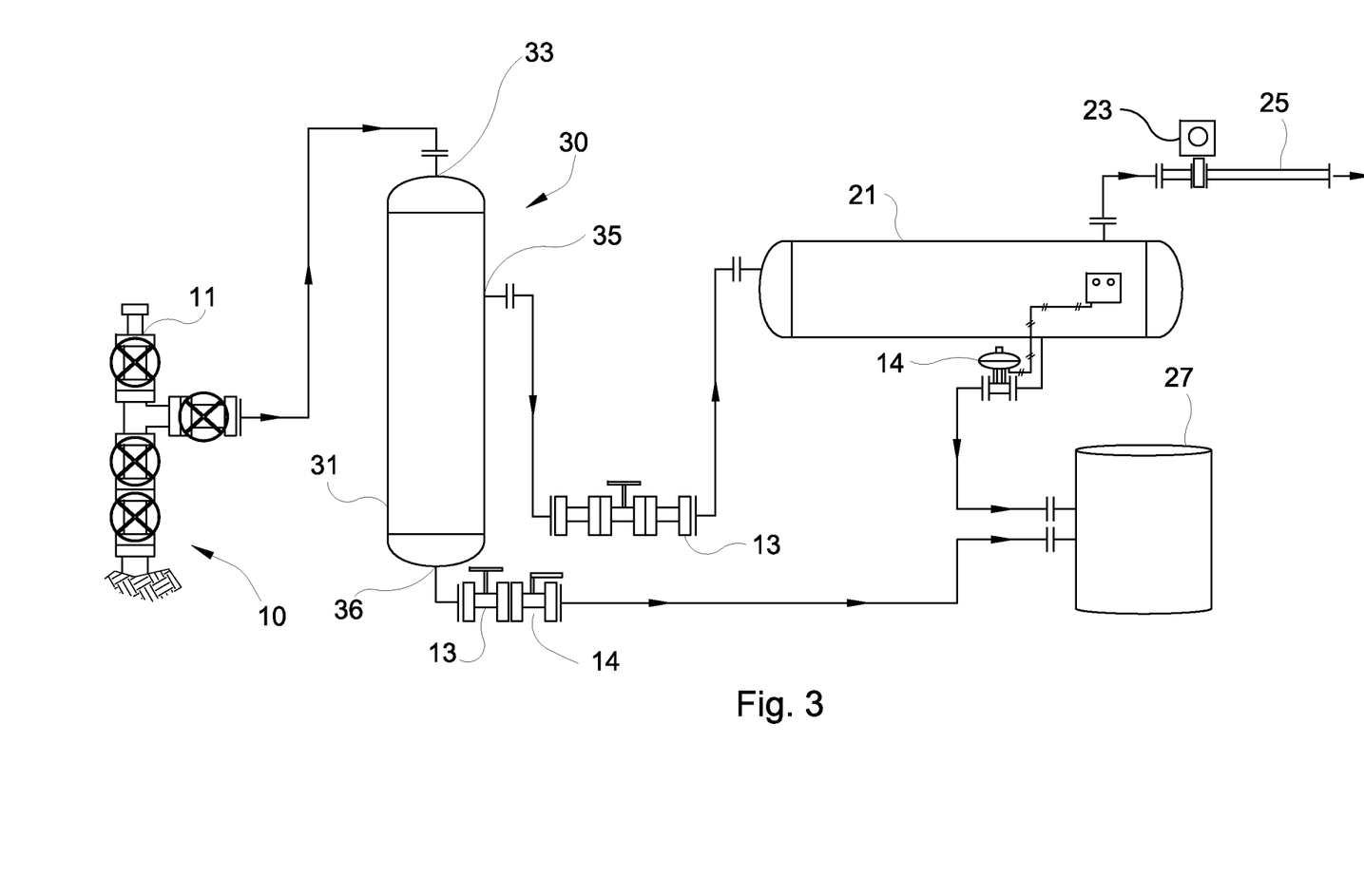
FIG. 3 shows, in schematic comparable to FIG. 1, operation of the sand separator of the present invention during production operation of the well site.

Referring first to FIGS. 1-3, the present invention comprises sand separator 30 installed at a natural gas well downstream from wellhead 10 and upstream from choke valve manifold 13 and other well site equipment 17, 21, 23. Sand separator 30 traps and separates sand and rock debris 5 within a stream of gaseous 1 and liquid 3 fluids effluent from wellhead 10. See also FIGS. 4A-4C. Under high pressure, gas 1 effectively is dissolved in water 3, and the fluid F leaving wellhead 10 moves under such high pressure and velocity that solids 5 remain substantially uniformly suspended in water 3. The unsurprising effect (absent sand separator 30) is to erode and damage relatively sensitive wellhead equipment, including choke valve manifold 13 adapted to reduce the velocity and pressure of the fluid before entering other equipment 17, 21, 23. NOTE: hereinafter, the term "fluid F" will be used primarily to refer to hydraulic fracturing fluid, which, at various stages, may include varying amounts of dissolved or suspended natural gas 1, oil or other liquids (not shown), as well as suspended sand and/or rock debris 5. One having ordinary skill in the art will recognize that the majority of fluid F comprises water 3, and that all such variations of fluid F are contemplated to be found within the present invention's operating environment. Where useful hereinafter, the term fluid F also may be used herein to refer to water 3, in contradistinction to its dissolved and/or suspended constituents, particularly where such constituents are present, if at all, in comparatively small amounts. Such usage will be apparent from the context.

Wellhead 10 comprises a "tree" of valves 11 coupled to the well bore casing (not shown) such that wellhead 10 may contain and regulate flow from the well, during both exploration and production. Valves 11 may cap (shut-in) the well altogether, and they serve to route well effluent fluid F to a plurality of surface equipment installations such as those depicted in FIGS. 1-3. One having ordinary skill in the art will recognize that FIGS. 1-3 are schematic in nature and not intended to represent a complete well site installation nor dimensional reality. As seen in FIGS. 1-2, choke valve manifold 13 feeds sand separator 30 effluent into low-pressure testing and separating equipment 17 where fracturing fluid F is recovered and collected in mobile tank 18 for off-site disposal. Flare stack 16 is provided to burn off into the atmosphere waste natural gas 1 separated from fluid F in test separator 17.

Where natural gas 1 is not a waste product but a primary production commodity (FIG. 3), it is not flared, but instead forwarded through metering equipment 23 into collector lines 25 and on to market. Liquid condensates from gas 1 are captured in production separator 21 and stored in tank 27 for later removal and transportation to market (not shown). One having ordinary skill in the art will recognize that fluid F captured in production separator 21 will contain substantially less of the residual fracturing water 3 of FIGS. 1, 2, and more desirable, non-waste liquids like petroleum and natural gas distillates, and that fluid F at this stage is intended to mean any such liquid byproducts having productive value, rather than waste products, as with separator 17.

Disposed between wellhead 10 and separators 17, 21, sand separator 30 removes solid materials 5 from the wellhead 10 effluent. Sand separator 30 comprises high pressure vessel 31 having a tubular body, or cylinder 32C, capped at both ends by upper and lower domed end caps 32U, 32L. Vessel 31 is constructed of materials and by processes, as discussed in detail below, that render vessel 31 capable of withstanding high pressures directly from wellhead 10, without requiring any intermediate velocity or pressure reducing equipment.

Sand separator 30 stands vertically erect to rely upon gravity for operation, as discussed in more detail below. Piping 15 from wellhead 10 couples to inlet 33 atop upper end cap 32U. Sand and other solid debris 5 removed from fluid F accumulates at the bottom of vessel 31 above end cap 32L and periodically may be removed from vessel 31 through sand outlet 36. The remaining fluid F, comprising almost entirely natural gas 1 and water 3, exits sand separator 30 at fluid outlet 35 where it proceeds through velocity-reducing choke valve manifold 13 and onward to test separator 17 (FIGS. 1, 2) or production separator 21 (FIG. 3).

Outlet 36 provided at the bottom of end cap 32L permits periodic removal for disposal of precipitated sand 5 accumulating atop lower end cap 32L. Such sand 5 accumulation actually comprises a relatively viscous but fluid sand/water slurry, substantially under wellhead pressure within vessel 31. Opening outlet 36 allows it first to pass through choke valve 13 to reduce its pressure and velocity and then through control valve 14 to a disposal site. As depicted in FIG. 1, sand 5 is merely routed into mobile tank 18 for disposal along with recovered fracturing fluid F. In the alternate system depicted in FIG. 2, a plastic-lined pit 19 is provided at the well site for discarding sand 5. One having ordinary skill in the art will recognize that all such methods of disposal of sand 5 and water 3 are contemplated by the present invention.

Figure 4A:
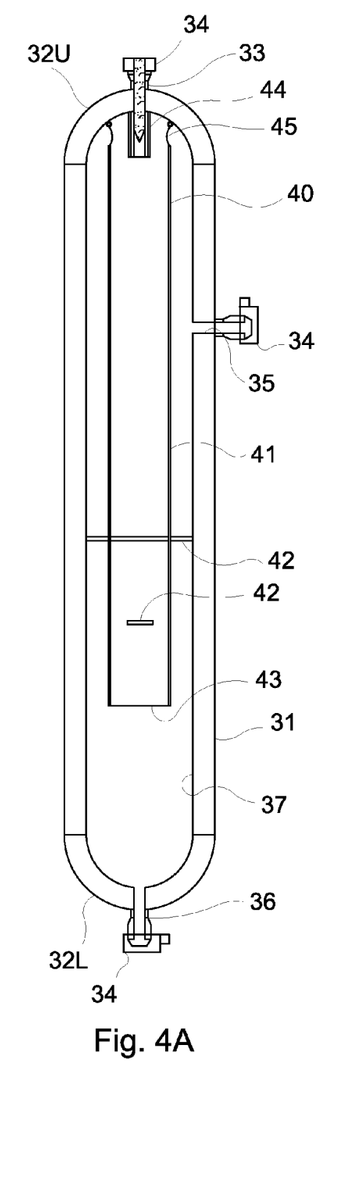
FIGS. 4A-4C detail the internal configuration and operation of the sand separator of the present invention.
Figure 4B:
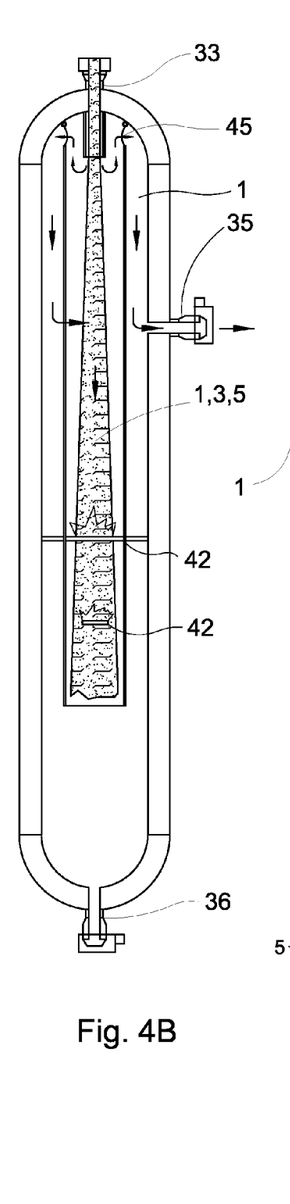
Figure 4C:
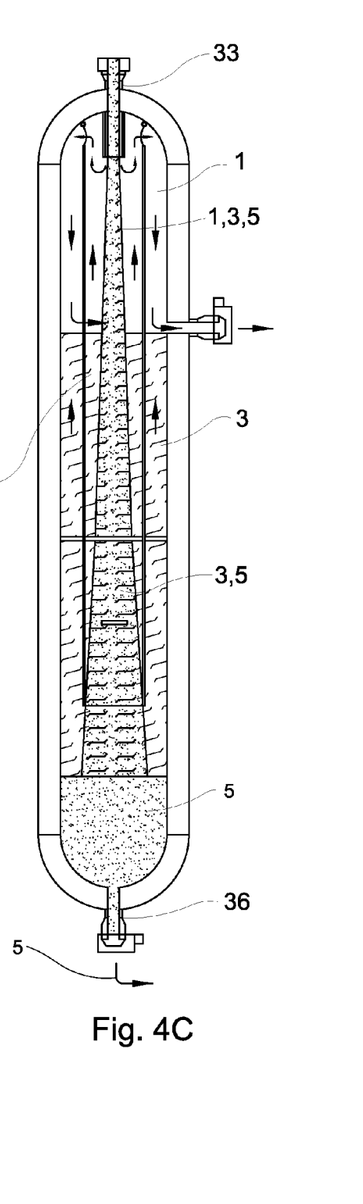

Turning now also to FIGS. 4A-4C, sand separator 30 further includes flue 40 depending coaxially inside vessel 31 from upper end cap 32U at inlet 33 and extending downward toward lower end cap 32L. Transverse baffles 42 disposed diametrically across its length a spaced distance above flue outlet 43 serve two purposes. First, they provide dimensional stability for flue 40, keeping it positioned coaxial with vessel 31 despite buffeting from the torrent of high pressure wellhead effluent fluid F. Second, since baffles 43 are disposed across the path of fluid F, they further slow it in its descent from inlet 33.

Flue 40 couples to upper end cap 32 surrounding inlet 33, from which nozzle, or downcomer 44 focuses wellhead 10 effluent fluid F into a longitudinally directed, high-velocity stream. Downcomer 44 prevents fluid F from spraying widely enough from inlet 33 to enter gas ports 45 arrayed around the perimeter of flue 40 near inlet 33 and above the lower end of downcomer 44. Gas ports 45 permit gas 1 to escape fluid F without passing through flue outlet 43 with the rest of fluid F, but instead to bypass flue outlet 35 and to exit flue 40 separately into the region of vessel 31 outside flue 40 and above fluid outlet 35. By letting gas 1 escape fluid F in this manner, separator 30 substantially reduces the velocity of fluid F as it proceeds downward within flue 40, thereby maximizing precipitation of sand 5 from fluid F, as discussed below.

The length of flue 40 and the consequent location of flue outlet 43 relative to fluid outlet 35 is selected to optimize operation of sand separator 30. Fluid F slows as it exits flue 40 at flue outlet 43 and then rises between the interior walls of vessel 31 and the outside of flue 40, hydraulically equalizing with its level inside flue 40 substantially at the elevation of fluid outlet 35. Depending upon the through-put volume and flow rate, a preferred head of fluid F above flue outlet 43 is needed. One having ordinary skill in the art will recognize that this dimension can vary with the size and application of sand separator 30, as well as the wellhead fluid F velocity. Preferably, flue outlet 43 is disposed beneath fluid outlet 35 approximately seventy (70%) percent of the overall height (distance between upper and lower end caps 32U, 32L) of cylinder 32C, but no less than eighteen (18 in.) inches above lower end cap 32L.

There being very little or no pressure differential across the walls of flue 40, it comprises a cylindrical, carbon or stainless, steel tube having a wall thickness adapted to contain the high velocity of fluid F without substantial deformation. Preferably, flue 40 has an ASTM Schedule 20 to Schedule 80, and preferably Schedule 40, wall thickness. The diameter of flue 40 is chosen to fall between 35% and 45%, and preferably 40%, of the inside diameter of cylinder 32C. Gas ports 45 through flue 40 preferably are round and of sufficient number and area to equal the cross section of flue 40. One having ordinary skill in the art will recognize that any shape of gas ports 45 will function satisfactorily as long as the total area of all gas ports 45 substantially equals or exceeds the cross-sectional area of flue 40.

Vessel 31 by contrast must withstand internal operating pressures defined by the shut-in pressure of wellhead 10, and must have an internal volume sufficient to accommodate the volume of gas 1 and fluid F reported for wellhead 10. Vessel 31, including cylinder 32C and end caps 32U, 32L, is constructed from carbon steel, and end caps 32U, 32L are welded into place (following ASME standards for code vessels and standard shop practices for non-code vessels) to close the ends of cylinder 32C securely against the wellhead 10 shut-in pressure, thereby creating vessel 31. Vessel 31 typically is approximately eight (8 ft.) feet in length, though one having ordinary skill in the art will recognize that the length of vessel 31 may be shorter or longer as needed. Thus, the diameter and wall thicknesses of vessel 31 are dictated by the wellhead 10 shut-in pressure and volumes reported for wellhead 10.

Depending upon the pressures of the gas field in which wellhead 10 is located, wellhead 10 shut-in pressures may range from as little as 1000 psig to as much as 15,000 psig. For example, the hydrostatic pressures experienced during 2010 in the Barnett Shale gas field in and around Fort Worth, Tex., typically fall into the range of 1000-1500 psig, thus defining the pressures sand separator 30 must endure in the region. Further, gas well pressures may surge from time-to-time substantially above such typical field shut-in pressures. Finally, vessel 31 also must be capable of the reported volume output of water 3 and gas 1 of wellhead 10 effluent fluid F. Such volumes of the Barnett Shale typically may be as much as 10 million cubic feet (MMCF/da.) of natural gas 1 per day with a water 3 content of 2000 barrels (bbls./da.) per day.

By way of a First Example, for relatively low wellhead 10 shut-in pressures such as those at the lower end of the ranges given above, vessel 31 preferably will have cylinder 32C and end caps 32U, 32L having outside diameters of sixteen (16 in.) inches with approximately two to two-and one-half (2 in.-2½ in.) inches of wall thickness. This provides an internal diameter of vessel 31 of nine to ten (9 in.-10 in.) inches, resulting in a flue 40 diameter of approximately three and one-half to four (3½ in. to 4 in.) inches. For a vessel 31 eight feet in length, flue 40 will be approximately five and one-half (5½ ft.) feet long.

For greater wellhead 10 shut-in pressures, larger diameter cylinders 32C and end caps 32U, 32L create a trade-off between diameter and wall thickness. As a Second Example, a wellhead 10 shut-in pressure of 5000 psig dictates that cylinder 32C walls must increase in thickness, thereby reducing the internal diameter of vessel 31 too much for the expected throughput volumes. This requires that its outside diameter of vessel 31 increase to accommodate thicker walls that can withstand the increased pressure while the internal diameter of vessel 31 remains sufficiently large for the reported volume throughput of natural gas 1 and fluid F. Thus, in the Second Example, vessel 31 having the same throughput as the First Example requires wall thicknesses of three to three and one-half (3 in. to 3½ in.) inches, requiring an outside diameter at least two to three (2 in. to 3 in.) inches greater than the 16 inches of the First Example. Preferably, a nominal outside diameter of twenty (20 in.) inches thus would be chosen to provide the same throughput volume.

Figure 5A:
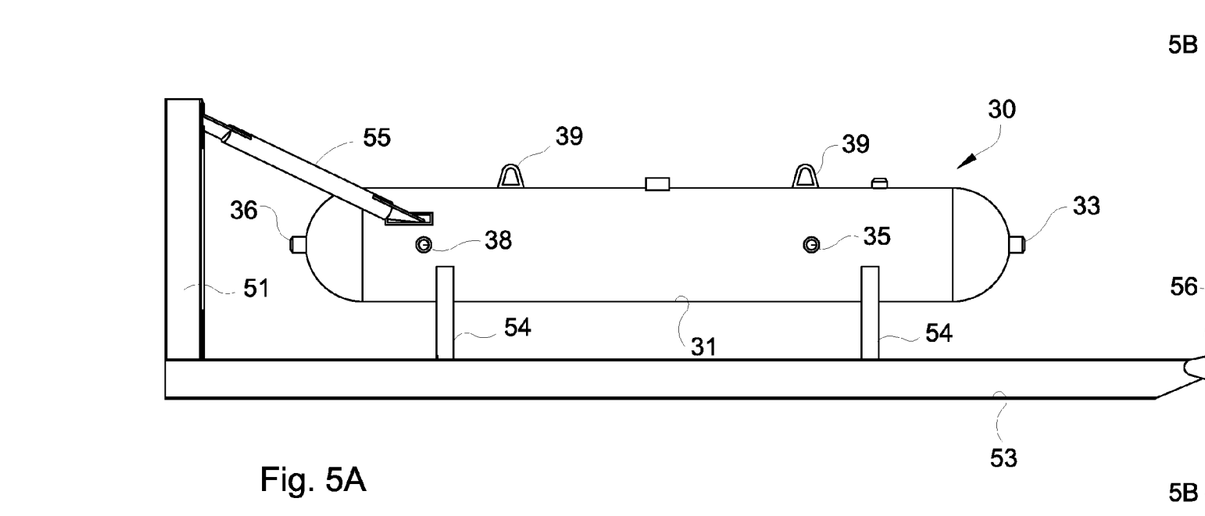
FIGS. 5A, 5B detail a support rack and skid for the sand separator of the present invention.
Figure 5B:
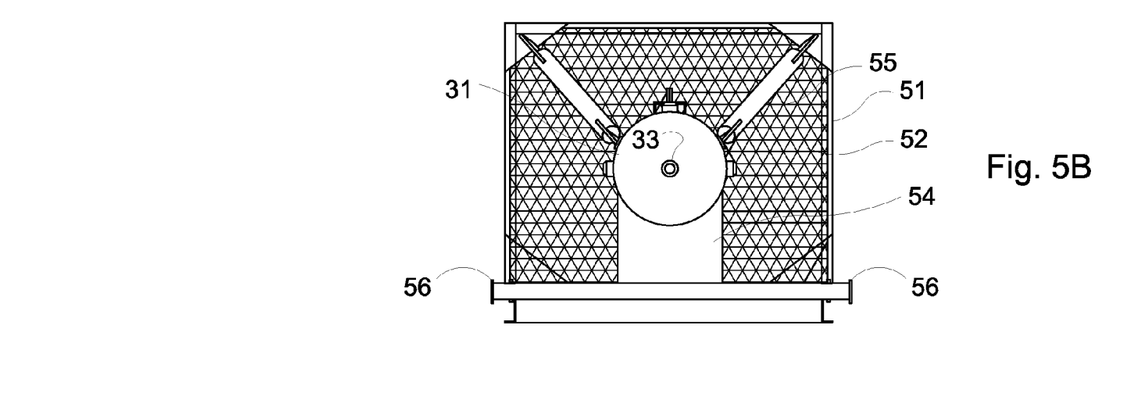

Turning now also to FIGS. 5A, 5B, rack 50 supports vessel 31 for both transportation and installation. Rack 50 comprises upright skid 53 from which yokes 54 extend to embrace the outside diameter of vessel 31. At its upper end, skid 53 may include wheels 56 adapted to allow it to roll on supporting surfaces (not shown) should it engage such surfaces. This can occur when rack 50 bearing sand separator 30 is removed from or being placed onto a trailer during transportation. Disposed at the opposite end of skid 53 from wheels 56, platform 51 extends perpendicular to skid 53 to form a base upon which sand separator 30 may be supported during storage and operation. Struts 55 extend from a lower portion of vessel 31 diagonally to the corners of platform 51 to brace vessel 31 and to give the equipment dimensional stability. Catwalk 52 disposed on the upper surface of platform 51 provides operators (not shown) a solid surface upon which to stand while installing or removing sand separator 30 at wellhead 10. Lifting lugs 39 disposed longitudinally along the outer surface of vessel 31 opposite skid 53 provide locations for manipulating the entire assembly during transportation and storage. Rack 50 is fabricated from carbon steel components of tubing, channel or beam steel commonly available.

In operation, wellhead 10 effluent fluid F enters vessel 31 through inlet 33 and nozzle 44, at substantially unchoked wellhead 10 pressures and velocity. Though fluid F immediately experiences a release of pressure because of the increased diameter of flue 40 and vessel 31 in contrast to piping 15, the pressure within vessel 31 remains much too high for surface equipment 13, 17, 21, 23. As it descends within flue 40, however, gas 1 separates from fluid F and rises within flue 40 toward gas ports 45, where it escapes flue 40 into the surrounding region of vessel 31 above outlet 35. With gas 1 released from the stream of fluid F now substantially containing only water 3 and sand 5 (see FIG. 4C), the velocity of fluid F slows considerably by the time it encounters baffles 42 (FIG. 4B) which further retard it. As fluid F exits flue 40 at flue outlet 43, it slows even further while turning the corner and beginning to rise along the outside of flue 40 against its own head pressure. One having ordinary skill in the art will recognize that fluid F at this point is primarily water 3. Water 3 rises until it reaches outlet 35, where it recombines with gas 1 and exits vessel 31 through fluid outlet 35.

As fluid F, still containing suspended sand 5, slows and reverses direction below flue outlet 43, sand 5 precipitates out of fluid F and accumulates atop the inside surface of lower end cap 33L. Periodically, an operator opens sand outlet 36 and permits sand 5 (sand/water slurry) to flow through choke valve 13 and control valve 14 to either mobile tank 18 or disposal pit 19.

While the invention has been particularly shown and described with reference to preferred and alternate embodiments, it will be understood by those skilled in the art that various changes in form and detail may be made therein without departing from the spirit and scope of the invention. For example, sand separator 30 may or may not be provided with support rack 50, depending upon the particular installation at the well site. Also, though separator 30 has been discussed above in the context of natural gas exploration and production, it works equally well for petroleum exploration and production. The lighter constituents of fluid F in this context are primarily petroleum, which escapes flue 40 through ports 45 as does gas 1 in the above discussion, and recombines at fluid outlet 35 with fluid F substantially freed of sand 5, as discussed above for natural gas 1.

We claim:

1. A sand separator for hydrocarbon fluids comprising
a cylindrical vessel having
vessel walls concentric about a longitudinal vessel axis and defining a vessel interior surrounded by a vessel exterior,
a vessel fluid inlet disposed at a vessel upper end and communicating between the vessel interior and the vessel exterior;
a sand discharge outlet disposed at a vessel lower end opposite the fluid inlet;
a vessel fluid outlet disposed within the vessel walls a spaced distance below the fluid inlet; and
a settling chamber disposed above the sand discharge outlet;
a flue descending a spaced distance within the vessel parallel to the vessel axis, the flue having
a flue inlet coupled to the vessel fluid inlet;
a flue outlet disposed above the settling chamber and the sand discharge outlet;
flue walls extending between the flue inlet and flue outlet and surrounding a flue interior and defining an upper vessel chamber outside the flue interior, and a plurality of gas ports disposed through the flue walls adjacent the fluid inlet and communicating between the flue interior with the upper vessel chamber; and fluid directing means coupled to and in fluid communication with the vessel inlet for directing hydrocarbon fluid from the fluid inlet into the flue.

2. The sand separator of claim 1 wherein the fluid directing means comprises nozzle means coupled to the vessel fluid inlet and extending substantially parallel to the vessel axis for directing hydrocarbon fluids from the fluid inlet into flue.

3. The sand separator of claim 1 wherein the fluid directing means comprises a downcomer nozzle coupled to the vessel fluid inlet and extending downward a spaced distance within the flue whereby the hydrocarbon fluids are discharged within the flue below the plurality of gas ports.

4. The sand separator of claim 1 and further comprising fluid buffering means disposed across the flue interior for buffering and slowing flow of hydrocarbon fluids within the flue.

5. The sand separator of claim 4 wherein the fluid buffering means comprises at least one flue baffle coupled to the flue walls, the at least one flue baffle extending radially outward from the flue walls to engage the vessel walls to affix the flue relative to the vessel axis and the vessel walls; and extending diametrically within the flue interior transverse the flue interior whereby the at least one flue baffle partially slows hydrocarbon fluid flow within the flue interior.

6. The sand separator of claim 1 and further comprising rack means disposed on the vessel exterior for supporting the sand separator in a substantially vertical orientation during operation thereof.

7. The sand separator of claim 6 wherein the rack means comprises a platform disposed a spaced distance beneath the sand discharge outlet, the platform having
a base adapted to rest on a surface;
a catwalk disposed on the base; and
a plurality of platform struts extending from the base to the vessel exterior;

an upright skid coupled to one side of the base and extending vertically upward parallel the vessel, the skid having a plurality of skid braces extending to the vessel exterior.

8. The sand separator of claim 7 and further comprising a plurality of wheels disposed on the skid at its end adjacent the vessel fluid inlet.

9. The sand separator of claim 7 and further comprising a plurality of lifting lugs disposed on the vessel exterior opposite the skid.

10. A separator for segregating solid and liquid constituents in a fluid stream, the separator comprising a cylindrical vessel having
vessel walls surrounding and defining a vessel interior having a longitudinal vessel axis extending between upper and lower vessel ends;
a fluid inlet disposed at the upper vessel end;
a sand discharge outlet disposed at the lower vessel end opposite the fluid inlet; and
a fluid outlet disposed along the vessel walls a spaced distance below the vessel fluid inlet;

a cylindrical flue descending a spaced distance within the vessel coaxial with the vessel axis, the flue having
a flue inlet coupled to the vessel fluid inlet;
a flue outlet disposed above the settling chamber and the sand discharge outlet;
flue walls extending between the flue inlet and flue outlet and surrounding a flue interior and defining an upper vessel chamber concentric the flue interior, and
a plurality of gas ports disposed through the flue walls adjacent the fluid inlet and communicating between the flue interior with the upper vessel chamber; and a downcomer nozzle coupled to the vessel fluid inlet and extending coaxially downward a spaced distance within the flue whereby the hydrocarbon fluids are discharged within the flue below the plurality of gas ports.

11. The separator of claim 10 and further comprising at least one flue baffle coupled to the flue walls, the at least one flue baffle extending radially outward from the flue walls to engage the vessel walls to affix the flue relative to the vessel axis and the vessel walls; and extending diametrically within the flue interior transverse the flue interior whereby the at least one flue baffle partially slows hydrocarbon fluid flow within the flue interior.

12. The separator claim 10 and further comprising a platform disposed a spaced distance beneath the sand discharge outlet, the platform having
a substantially rectangular base adapted to rest on a substantially horizontal surface;
a catwalk disposed on the base; and
a plurality of platform struts extending from at least two corners of the base to the vessel exterior;

an upright skid coupled to one side of the platform base and extending vertically upward parallel the vessel a spaced distance above the vessel inlet, the skid having
a plurality of skid braces extending to the vessel exterior; and
a plurality of wheels disposed on the skid at its end adjacent the vessel fluid inlet; and a plurality of lifting lugs disposed on the vessel exterior opposite the skid.

13. An improved method of separating sand and solid debris from a hydrocarbon fluid, the method comprising providing a sand separator having cylindrical walls surrounding a vertical axis and defining a separator interior, the separator further having
a fluid inlet disposed at an upper end of the separator;
a sand discharge outlet disposed at a lower end of the separator;
a fluid outlet disposed between the upper and lower ends of the separator;
a coaxial flue coupled to the fluid inlet interior and extending coaxially downward to a flue outlet disposed above a settling chamber atop the sand discharge outlet;
gas ports communicating between separator interior and a flue interior; and
a downcomer nozzle extending from the fluid inlet into the flue interior past the gas ports; then coupling the fluid inlet to a well head;
coupling the fluid outlet to a fluid storage means; and
coupling the sand discharge outlet to a sand disposal means; then operating the sand separator to
- direct hydrocarbon fluid from the well head into the separator interior through the fluid inlet;
- channel the hydrocarbon fluid to flow axially downward through the flue interior to the settling chamber;
- allow dissolved gas in the hydrocarbon fluid to escape through the gas ports into the separator interior, thereby slowing the hydrocarbon fluid flow;
- allow sand and other solid debris suspended within the hydrocarbon fluid to precipitate out of the slowed hydrocarbon fluid within the settling chamber;
- direct the remaining hydrocarbon fluid upward within the separator between the flue and the separator walls out the fluid outlet to the fluid storage means; and
- periodically open the sand discharge outlet to discharge said sand and other solid debris accumulated within the settling chamber.

14. The improved method of claim 13 and including the additional steps of
- providing at least one baffle coupled to the flue, the at least one baffle
  - extending radially outward from the flue to engage the separator walls to affix the flue relative to the vertical axis and the separator walls; and
  - extending diametrically across the flue interior whereby the at least one flue baffle further slows hydrocarbon fluid flow within the flue interior.

15. The improved method of claim 13 and including the additional step of
- providing a platform disposed beneath the sand discharge outlet and having
  - a substantially rectangular base adapted to rest on a substantially horizontal surface;
  - a catwalk disposed on the base; and
  - a plurality of platform struts extending from at least two corners of the base to the separator;
- an upright skid coupled to one side of the platform base and extending vertically upward parallel the vertical axis a spaced distance above the fluid inlet, the skid having
  - a plurality of braces extending to the separator; and
  - a plurality of wheels disposed on the skid opposite the platform; and
- a plurality of lifting lugs disposed on the separator opposite the skid.

16. A sand separator for hydrocarbon fluids comprising
- a cylindrical vessel having
  - vessel walls concentric about a longitudinal vessel axis and defining a vessel interior surrounded by a vessel exterior,
  - a vessel fluid inlet disposed at a vessel upper end and communicating between the vessel interior and the vessel exterior;
  - a sand discharge outlet disposed at a vessel lower end opposite the fluid inlet; and
  - a vessel fluid outlet disposed within the vessel walls a spaced distance below the fluid inlet;
- fluid channeling means depending from the vessel upper end for channeling fluid from the fluid inlet into a settling chamber disposed above the sand discharge outlet;
- fluid directing means coupled to and in fluid communication with the vessel inlet for directing hydrocarbon fluid from the fluid inlet into the fluid channeling means;
- a platform disposed a spaced distance beneath the sand discharge outlet, the platform having
  - a platform base;
  - a catwalk disposed on the platform base; and
  - a plurality of platform struts extending from the platform base to the vessel exterior; and
- an upright skid coupled to the platform base and extending parallel the vessel, the skid having a plurality of skid braces extending to the vessel exterior.

17. The sand separator of claim 16 wherein the fluid channeling means comprises
- a flue coupled to the vessel fluid inlet, the flue having
  - flue walls defining a flue interior and an upper vessel chamber outside the flue within the vessel; and
  - a plurality of gas ports disposed within the flue walls adjacent the vessel inlet and communicating between the flue interior with the upper vessel chamber.

18. The sand separator of claim 17 wherein the fluid directing means comprises
- a nozzle coupled to the vessel fluid inlet and extending into the flue past the gas ports.

* * * * *